United States Patent
Ahmed et al.

(10) Patent No.: US 12,452,162 B2
(45) Date of Patent: Oct. 21, 2025

(54) METHODS AND DEVICES FOR REPLICATING MULTICAST CONTROL PACKETS IN HARDWARE

(71) Applicant: Ruckus IP Holdings LLC, Claremont, NC (US)

(72) Inventors: Mohammad Nasir Ahmed, Bangalore (IN); Sridhar Malarouthu, Pleasanton, CA (US)

(73) Assignee: Ruckus IP Holdings LLC, Claremont, NC (US)

( * ) Notice: Subject to any disclaimer, the term of this patent is extended or adjusted under 35 U.S.C. 154(b) by 465 days.

(21) Appl. No.: 17/973,604

(22) Filed: Oct. 26, 2022

(65) Prior Publication Data
US 2023/0126314 A1   Apr. 27, 2023

(30) Foreign Application Priority Data
Oct. 27, 2021  (IN) .............................. 202141049050

(51) Int. Cl.
*H04L 45/16* (2022.01)
*H04L 12/18* (2006.01)
*H04L 45/58* (2022.01)

(52) U.S. Cl.
CPC .............. *H04L 45/16* (2013.01); *H04L 12/18* (2013.01); *H04L 45/58* (2013.01)

(58) Field of Classification Search
None
See application file for complete search history.

(56) References Cited

U.S. PATENT DOCUMENTS

| | | | |
|---|---|---|---|
| 8,576,844 B1 * | 11/2013 | Ghosh ................... | H04L 61/103 370/390 |
| 2019/0097839 A1 * | 3/2019 | Narayanan .......... | H04L 12/4633 |

* cited by examiner

*Primary Examiner* — Christine T Duong
(74) *Attorney, Agent, or Firm* — Myers Bigel, P.A.

(57) ABSTRACT

Methods, systems, and devices for performing replication of multicast control packets by a packet processor of a networking device, rather than a central processor of the networking device, thereby freeing the central processor to perform other tasks. For example, methods of performing replication of multicast control packets may include learning, by a networking device, two or more local routers coupled to ports of the networking device; configuring a packet processor of the networking device for hardware-based replication of multicast control packets based on the learned two or more local routers; receiving a multicast control packet by the networking device; and replicating, by the packet processor of the networking device, the multicast control packet.

20 Claims, 6 Drawing Sheets

METHODS AND DEVICES FOR REPLICATING MULTICAST CONTROL PACKETS IN HARDWARE

CROSS-REFERENCE TO RELATED APPLICATION

The present application claims the benefit of priority to Indian Patent Application No. 202141049050, filed on Oct. 27, 2021, in the Indian Patent Office, and the entire contents of the above-identified application are incorporated by reference as if set forth herein.

TECHNICAL FIELD

The present invention generally relates to network communications and, more particularly, to multicast network communications.

BACKGROUND

Multicast is a communication technology in which data may be transmitted to multiple destination computing devices simultaneously; an example use case of such a technology is live streaming multimedia. Multicast may be efficiently implemented in a network in a form sometimes referred to as network-assisted multicast. In network-assisted multicast, a source (such as a video content source) may generate a single stream of packets, and network devices of a computing network, such as routers and switches, may direct and replicate the single stream of packets as needed, resulting in multiple copies of the stream of packets each being delivered to a respective receiving computing devices.

Although multicast may be implemented at different layers of networking models (e.g., the OSI (Open Systems Interconnect) model, the RFC 1122 Internet model), one common implementation is Internet Protocol (IP) multicasting. In IP multicasting, IP datagrams (sometimes referred to as packets) are communicated to a group of interested receivers in a single transmission. IP multicasting is provided in both the historically dominant IP Version 4 (IPv4) and the increasingly utilized IP version 6 (IPv6).

In IP multicasting, a source computing device uses a group address as the IP destination address in IP datagrams transmitted by the source. Receiving computing devices can then inform the network that they are interested in receiving packets sent to that group address. FIG. 1 is an example multicast topology or tree 10. For example, the source 11 can send data packets 42 to a first network address (239.X.Y.Z). Each interested receiver (here, client devices 12-1, 12-2, and 12-5) will inform the network (and more specifically, the upstream switches 20 and local router 30 that service the interested receivers) that the receivers 12 are interested in receiving data packets sent to the group 239.X.Y.Z.

More specifically, each receiving device 12 (sometimes referred to as a host) will transmit a message using a multicast management protocol, such as Internet Group Management Protocol (IGMP) for IPv4 and Multicast Listener Discovery (MLD) for IPv6. This message, called a Membership Report (or Report) message will be transmitted by the interested receiver 12-1, 12-2, 12-5 to a local multicast-enabled router 30. The local multicast-enabled router 30 will then generate and transmit messages to neighboring routers (not shown) on a network 37 using a protocol such as Protocol Independent Multicast (PIM), resulting in a path to the multicast source 11 being created or joined. In some situations, this path terminates at one end with local router 31 that is serving as a rendezvous point for the multicast data from multicast source 11. In other situations (not illustrated in FIG. 1), multicast traffic may be broadcast from multicast source 11 to all routers 31 connected thereto, and from the routers 31 on to their neighbor routers, with individual routers able to unsubscribe or prune themselves from the broadcasted streams of packets.

When a multicast receiver 12 is no longer interested in a subscribed-to multicast stream, the multicast receiver 12 may send an IGMP or MLD Leave message to the local router 30. Periodically, and in part because such Leave messages are not strictly required, the local multicast-enabled router 30 may transmit IGMP or MLD Query messages to the hosts serviced by the router 30. Such Query messages are used by the multicast router 30 to determine which multicast addresses are of interest (or still of interest) to hosts, and help the router to refresh and maintain the group membership state for hosts serviced by the router.

There may be one or more intervening network devices, such as network switches 20 and access points 35, between a local multicast router 30 and a multicast receiver 12. These network devices also participate in network-assisted multicast and work to ensure that multicast streams are delivered to other network devices. Some network switches use message "snooping" and read IGMP or MLD messages that are addressed to other devices, both to learn the local topology of multicast-participating devices and reduce or prevent flooding devices with streams of unwanted multicast packets. In this way, uninterested devices (such as client devices 12-3 and 12-4) do not need to receive data traffic that is unnecessary to them.

A network switch 20 or router 30 may replicate received (or ingress) packets on a first port (an ingress or inbound port) and transmit (or egress) the replicated packets on two or more second ports (egress or outbound ports). Some switches and routers use centralized processing by a central processing unit (CPU) to perform replication, referred to herein as software-based replication or software forwarding. This CPU is usually tasked with many different functions and operations; accordingly, software-based replication of packets has the possibility to overwhelm the CPU and/or be too slow to achieve desired network characteristics. Some routers and switches therefore utilize distributed processing, and include specialized application-specific integrated circuits (ASICs) to perform data packet replication and forwarding from one hardware port (or a line card) to another, referred to herein as hardware-based replication or hardware forwarding. The CPU is then responsible for administering the specialized ASICs.

SUMMARY

Some embodiments of the present disclosure provide methods of replicating multicast control packets in hardware. For example, a method may include learning, by a networking device, two or more local routers coupled to ports of the networking device; configuring a packet processor of the networking device for hardware-based replication of multicast control packets based on the learned two or more local routers; receiving a multicast control packet by the networking device; and replicating, by the packet processor of the networking device, the multicast control packet.

The networking device may include a central processor separate from the packet processor. The central processor may perform the configuring of the packet processor for the hardware-based replication of multicast control packets. The central processor may perform the learning of the two or more local routers coupled to the ports of the networking device.

In some embodiments, receiving of the multicast control packet by the networking device may include receiving the multicast control packet by the central processor. The central processor may obtain a replication identifier, and replicating the multicast control packet by the packet processor may be based on the replication identifier.

The packet processor may be associated with a table mapping replication identifiers to ports of the networking device associated with the learned two or more local routers. Learning of the two or more local routers coupled to the ports of the networking device may include reading a control message addressed to a device different from the networking device. The control message may be an Internet Group Management Protocol (IGMP), Multicast Listener Discovery (MLD) message, or a Protocol Independent Multicast (PIM) message.

In some embodiments, receiving the multicast control packet by the networking device may include receiving the multicast control packet by the packet processor, and the packet processor may obtain from a control lookup table a replication identifier. Replicating the multicast control packet by the packet processor may be based on the replication identifier obtained from the control lookup table. The packet processor may be associated with a table mapping replication identifiers to ports of the networking device associated with the learned two or more local routers. Obtaining the replication identifier from the control lookup table may include performing a look up in the control lookup table using at least one field of the multicast control packet.

Another example of a method provided by the present disclosure may include learning, by a first processor of a networking device, two or more local routers coupled to ports of the networking device; configuring, by the first processor of the networking device, a second processor of the networking device for hardware-based replication of multicast control packets based on the learned two or more local routers; receiving, by the first processor, a multicast control packet; obtaining, by the first processor, a replication identifier associated with at least two ports of the networking device; injecting, by the first processor, the replication identifier and the multicast control packet into the second processor; and replicating, by the second processor, the multicast control packet.

Another example of a method provided by the present disclosure may include learning, by a first processor of a networking device, two or more local routers coupled to ports of the networking device; configuring, by the first processor of the networking device, a second processor of the networking device for hardware-based replication of multicast control packets based on the learned two or more local routers; receiving, by the second processor, a multicast control packet; obtaining, by the second processor, a replication identifier associated with at least two ports of the networking device; and replicating, by the second processor and based on the replication identifier, the multicast control packet.

In addition to the methods discussed above, other methods as well as devices and systems in which hardware-based replication of multicast control packets are provided herein.

BRIEF DESCRIPTION OF THE DRAWINGS

Like reference numerals refer to corresponding parts throughout the drawings. Moreover, multiple instances of the same part may be designated by a common prefix separated from an instance number by a dash.

DETAILED DESCRIPTION

Figure 1:
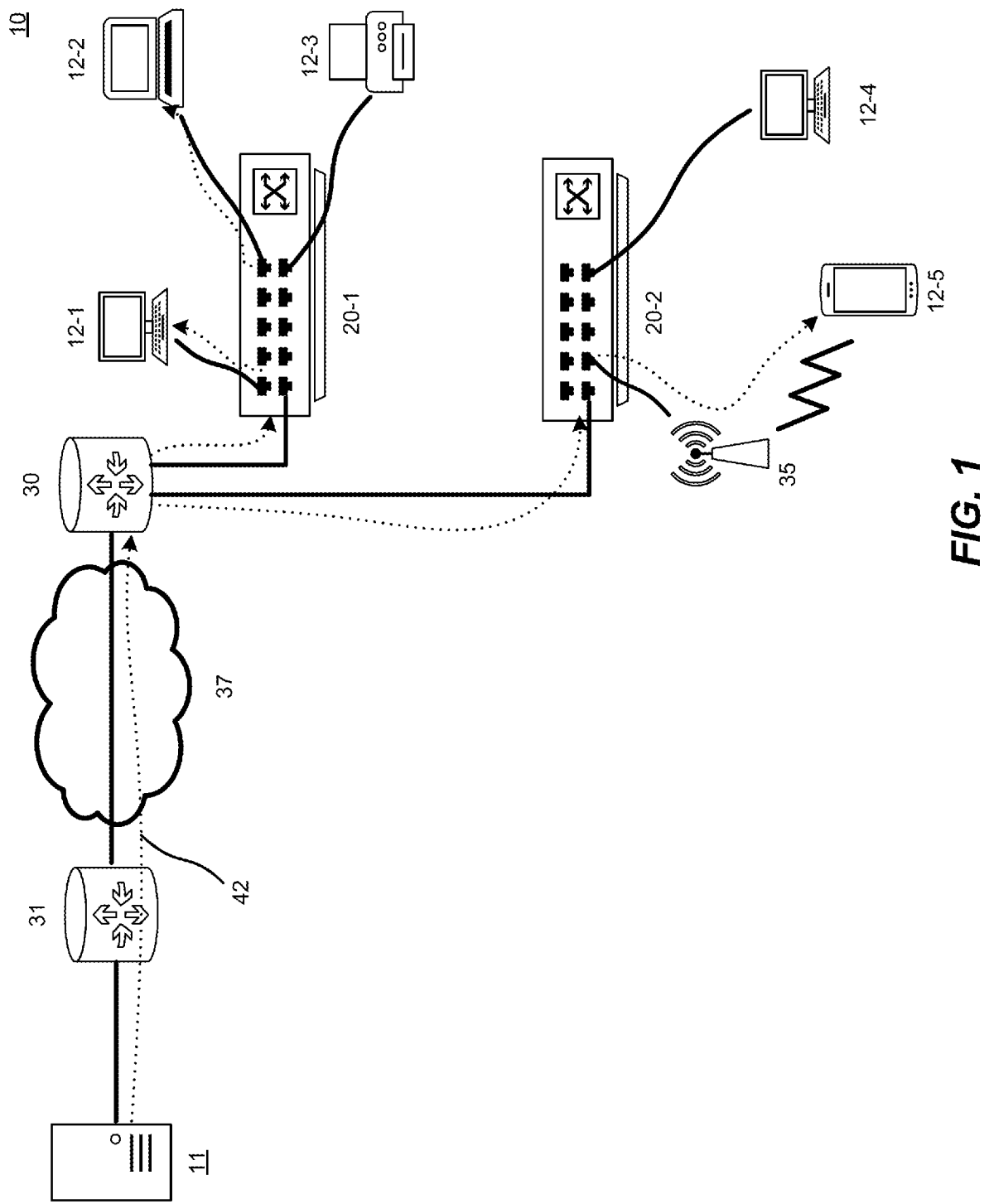
FIG. 1 is a block diagram of a multicast topology or tree to assist in understanding the inventive concepts of the present disclosure.

As discussed above, data packets are increasingly hardware-replicated using specialized hardware, such as ASICs. However, multicast control packets, such as IGMP, MLD, and PIM packets are not replicated in hardware, and instead are software replicated by the CPUs of networking devices. The present disclosure is based on the recognition that this lack of hardware-based replication may result in networking systems and devices taking a longer amount of time to setup or manage the multicast tree than is desirable or acceptable, especially in topologies or trees more complicated than the relatively simple example of FIG. 1.

Figure 2:
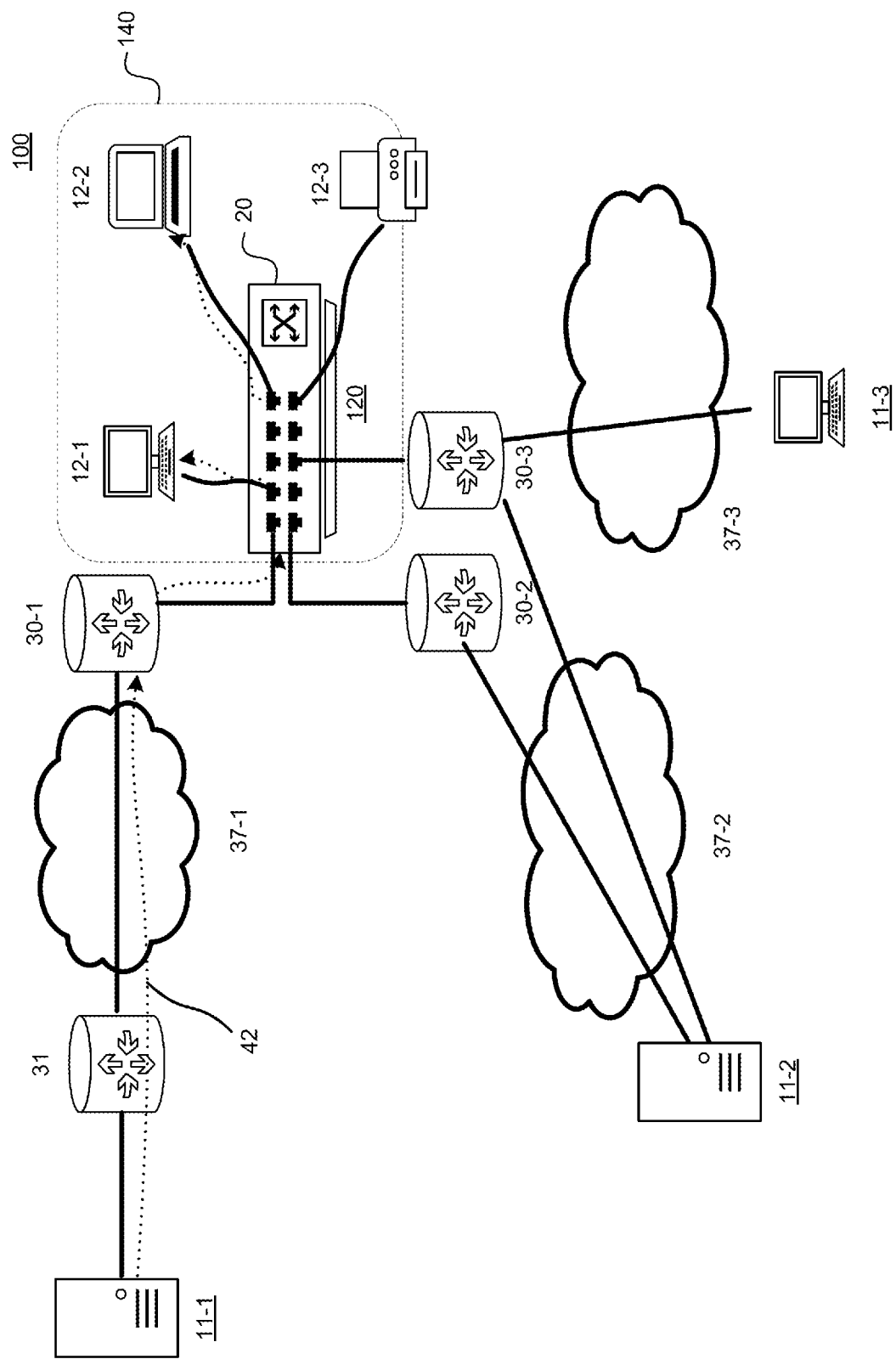
FIG. 2 is a block diagram of another multicast topology or tree to assist in understanding the inventive concepts of the present disclosure.

For example, FIG. 2 is a more complicated multicast topology 100, showing that a switching cluster 120 (that includes one or more interconnected switches 20) providing a local area network (LAN) 140 may be coupled to multiple routers 30-1, 30-2, and 30-3. Each of the multiple routers 30 may provide access to one or more networks 37. Although illustrated as separate in FIG. 2, each network 37 may be the same network. For example, the network 37-1 may be the same network as network 37-2, and the routers 30-1 and 30-2 may provide multiaccess load balancing and/or redundancy to the switching cluster 120. Additionally, or alternatively, each router 30 may provide the switching cluster 120 access to a different network 37, and to devices or resources connected thereto. The networks 37 may be or may include wide area networks and/or the Internet. Note that in FIG. 2, not all devices are shown for simplicity of illustration. For example, local routers 31 for multicast sources 11-2 and 11-3 are not shown.

Each router 30 may be configured as a multicast router and may provide the hosts 12 connected to the switching cluster 120 with a path to one or more multicast sources 11. The routers 30 may communicate with each other via the LAN 140 and the switching cluster 120 thereof. For example, PIM "hello" packets and other control packets may be communicated between the routers 30 to enable the routers 30 to manage the administration of multicast functions for the LAN 140.

Some multicast sources 11 may be reachable via two or more routers (such as multicast source 11-2, which can be reached via routers 30-2 and 30-3). In such situations, one of the two or more routers 30-2 and 30-3 may be elected as a designated router (DR) to avoid duplicating multicast traffic for connected hosts 12. For example, router 30-2 may be elected as DR for the switching cluster 120 and the hosts 12 connected thereto. Router 30-2 may handle for the hosts 12 the constructing, joining, and leaving of a multicast group associated with multicast data from source 11-2, and router 30-3 may act as a standby or failover DR should router 30-2 become inoperable. Router 30-3 may detect the inoperability of router 30-2 and responsive to the detection send a request to join the multicast group on behalf of the hosts 12.

As can be seen, routers 30-1, 30-2, and 30-3 in the multicast topology 100 may each require separate copies of multicast control packets, such as IGMP, MLD, and PIM packets for various reasons, such as to manage internal awareness of a state of the multicast membership of the hosts 12 within the LAN 140, because the router 30 is acting as an elected DR or standby DR for multicast traffic in multiaccess situations, and/or because the router 30 is the sole router 30 along a path for multicast traffic (e.g., for a separate network 37 and/or part of a network 37). Software-based replication of these multicast control packets by switching cluster 120 (and the switches thereof) results in an increased time to setup or manage the multicast tree than is desirable or acceptable. As demand for low-latency networks and multicast transmissions is increasing, delay in establishing or managing multicast tress and groups is disadvantageous.

Figure 3A:
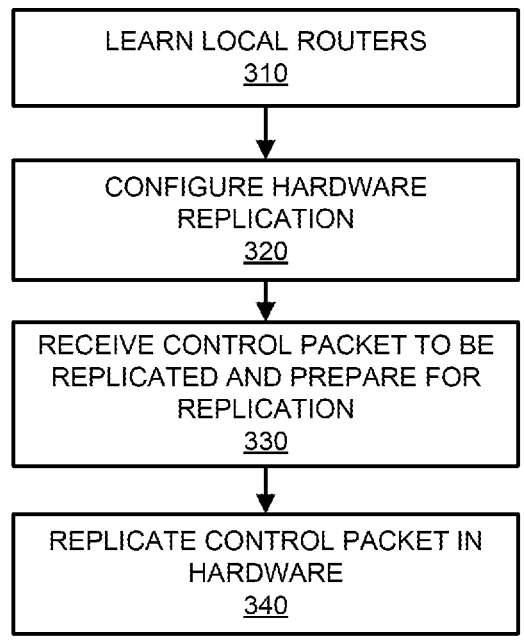
FIG. 3A is a flowchart illustrating operations of a method of performing hardware-based replication of multicast control packets.
Figure 3B:
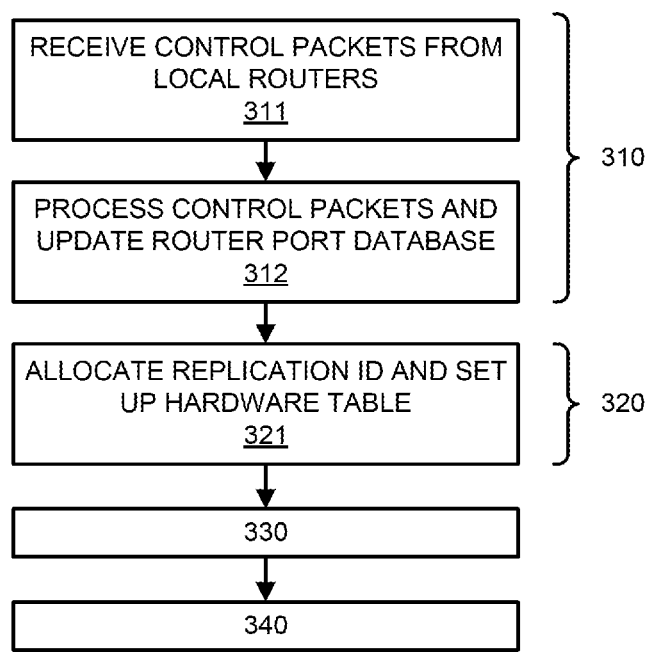
FIG. 3B is a flowchart illustrating operations of a method of performing hardware-based replication of multicast control packets.

Aspects of the present disclosure therefore provide for hardware-based replication of multicast control packets by a networking device, such as a networking switch 20 within the switching cluster 120 of FIG. 2. Reference is made to FIGS. 3A, 3B, and 5, which describe aspects of example methods for performing hardware-based replication of multicast control packets, and FIG. 4, which illustrates a block diagram of an example network switch 220 according to some embodiments. Network switch 220 may be used in various switching clusters, such as the switching cluster 120 of FIG. 2.

Figure 4:
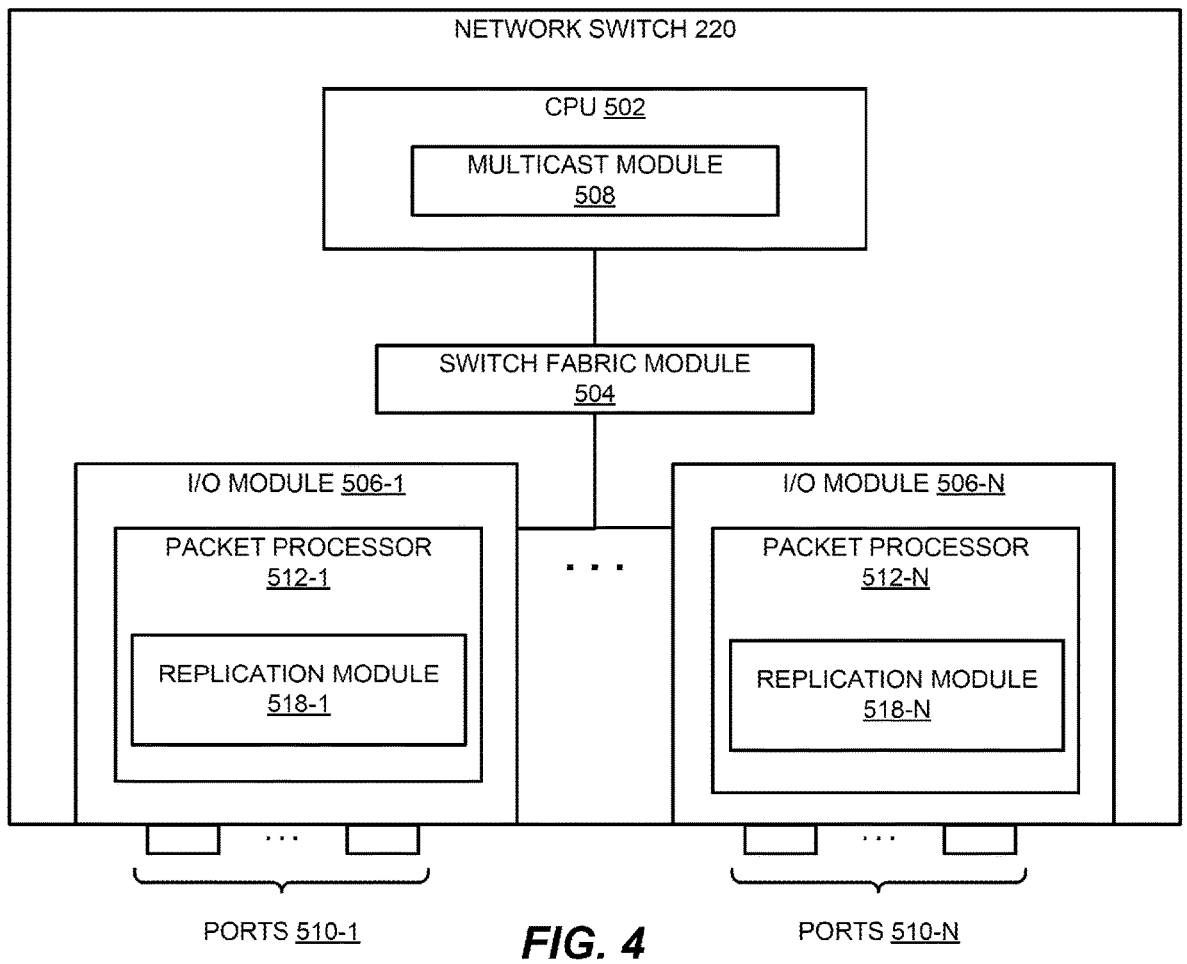
FIG. 4 is a block diagram illustrating an example of a network switch in accordance with some embodiments.
Figure 5:
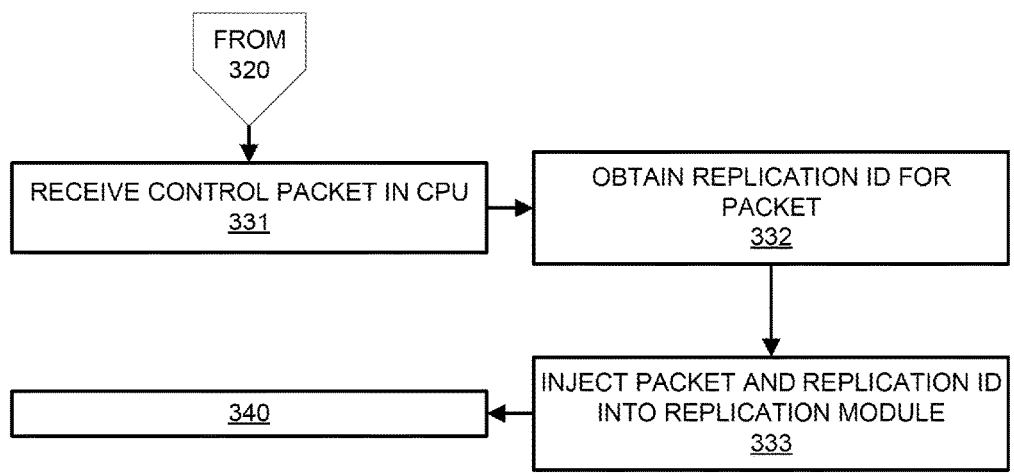
FIG. 5 is a flowchart illustrating operations of a method of performing hardware-based replication of multicast control packets using the network switch of FIG. 4.

As shown in FIG. 4, the network switch 220 includes one or more CPUs 502, at least one I/O module 506, and a switch fabric module 504.

The one or more CPUs 502 are configured to manage and/or control the operation of the switch 220. Each CPU 502 can be a general-purpose processor, such as a PowerPC, Intel, AMD, or ARM-based processor that operates under the control of software stored in an associated memory (not shown in FIG. 4). The software may include a multicast module 508 described in greater detail below. Additional functionality may be present in the processor and/or memory, but may not be shown in the block diagram of FIG. 4 to simplify the illustration.

The switch fabric module 504 and I/O modules 506 collectively represent the forwarding plane of network switch 220. The switch fabric module 504 is configured to interconnect the various other modules of network switch 220. Each I/O module 506 can include one or more input/output ports 510 that are used by network switch 220 to send and receive data and control packets. Each I/O module 506 can also include a packet processor 512. The packet processors 512 may be hardware processing components (e.g., an ASIC or Field Programmable Gate Array (FPGA)) that can make wire speed decisions on how to handle incoming or outgoing packets. Each packet processor 512 may include a replication module 518 as well as other functionality than that shown in FIG. 4.

The replication module 518 may be configured to receive a packet to be replicated, perform multicast replication of the packet to be replicated, and forward the replicated packets to various of the ports 510. In some embodiments, the replication module 518 may be an ingress replication module, where an incoming packet received on a first port 510 of the I/O module 506 is replicated, and the replicated packets are forwarded to various ports 510 of the networking switch 220 (e.g., via the switch fabric module 504). In some embodiments, the replication module 518 may be an egress replication module, where a packet is received by one of the packet processors 512-1 from the switch fabric module 504, is replicated by the egress replication module 518-1 of that packet processor 512-1, and then the replicated packets are transmitted outside the network switch 220 via two or more of the ports 510-1 of the I/O module 506-1 associated with that packet processor 512-1.

The replication module 518 may include a data store, such as a table (and referred to as such herein) that maps out an association between a replication identifier (REP-ID) and ports or interfaces 510 of the network switch 220. The table can be implemented in a variety of ways, such as ACL rules, TCAM rules, hash tables, exact match tables, or the like. For example, the replication module 518 may map a first identifier (REP-ID1) with two ports 510 (Port 3 and Port 9), a second identifier (REP-ID2) with three ports 510 (Port 1, Port 3, and Port 7), and so on. During operation, the replication module 518 may receive a packet to be replicated, access the table to lookup a replication identifier (for example by using one or more lookup rules), identify the ports 510 associated with the replication identifier, replicate the packet a number of times corresponding to a number of ports 510, and then forward each copy of the packet to a respective port 510.

The replication module 518 and the table thereof may be managed by the CPU 502, and specifically the multicast module 508 thereof. The multicast module 508 may be configured to receive multicast control packets and configure the replication module 518 accordingly. For example, as discussed above, the multicast module 508 may be configured to perform message "snooping" and read IGMP or MLD messages that are addressed to other devices (e.g., routers 30), both to learn the local topology of multicast-participating devices and reduce or prevent flooding devices with streams of unwanted multicast packets. The multicast module 508 may then create, update, and/or delete entries in the table of the replication module 518 based on the snooped messages to provide for hardware-based replication of multicast data packets.

Aspects of the present disclosure provide that the multicast module 508 and the replication module 518 are also configured to perform hardware-based replication of multicast control packets. Referring now to FIG. 3A, the network switch 220 (e.g., the multicast module 508 and the replication module 518 thereof) may perform a method of replicating multicast control packets in hardware. Operations of the method may include learning, by the network switch 220 (and more specifically by the multicast module 502), the local multicast-enabled routers 30 and the ports/interfaces of the network switch 220 that are associated or coupled with the local multicast-enabled routers 30 (block 310). After the local multicast-enabled routers 30 are learned, the CPU 502 and the multicast module 508 may configure the replication module 518 for hardware-based replication of multicast control packets (block 320). A multicast control packet may be received and the network switch 220 may prepare for replication of the multicast control packet (block 330). The multicast control packet may then be replicated in hardware; that is, the multicast control packet may be replicated by the replication module 518 of the packet processor 512, rather than the CPU 502 (block 340). As discussed above, replicating the packet may include accessing a table to lookup a replication identifier (for example by using one or more lookup rules), identifying ports associated with the replication identifier, replicating the packet a number of times corresponding to a number of identified ports, and forwarding each copy of the packet to a respective identified port.

Aspects of learning the local multicast-enabled routers 30 (block 310 of FIG. 3A) and configuring of the replication modules 518 for hardware-based replication of multicast control packets (block 320 of FIG. 3A) are described in greater detail with respect to FIG. 3B. In some embodiments, learning the local multicast-enabled routers 30 by the network switch may include receiving control packets from the local routers 30 as the control packets traverse the network (block 311). As discussed above, routers 30 may communicate PIM messages, such as "hello" messages, join messages, prune messages, or the like, to other routers 30 to provide multicast functionality or to discover each other. The routers 30 may also transmit IGMP or MLD Query messages to hosts serviced by the router 30 to determine which multicast groups or addresses are of interest (or still of interest) to hosts and help the router 30 to refresh and maintain the group membership state for hosts serviced by the router 30. These messages may be received by the networking switch 220.

The networking switch 220, and more specifically the CPU 502, may process the received control packets from routers 30 and update a router port database associated with the multicast module 508 (block 312). The processing of the control packets may include the message "snooping" discussed above. In addition, the multicast module 508 may store an association between a port 510 and the one or more routers 30 that are in communication with the networking switch 220 via the port 510.

As part of configuring the replication modules 518 for hardware-based replication of multicast control packets, the networking switch 220, and more specifically the CPU 502, may allocate a replication identifier and set up a hardware table in the replication module 518 with an association between the replication identifier and one or more ports 510. Each of the ports 510 may be in turn associated with one or more routers 30 that were identified by the networking switch. Again, using the example above, the replication module 518 may map a first identifier (REP-ID1) with two ports 510 (Port 3 and Port 9), a second identifier (REP-ID2) with three ports 510 (Port 1, Port 3, and Port 7), and so on.

Aspects of receiving the control packet to be replicated and preparing for replication (block 330 of FIG. 3A) in the network switch 220 of FIG. 4 are described in greater detail with respect to FIG. 5. The multicast control packet to be replicated may be received by the CPU 502 (block 331). The CPU 502 may obtain a replication identifier for the multicast control packet (block 332). For example, the CPU 502 may examine one or more fields of the packet (e.g., source address, destination address, or the like) and may ascertain a replication identifier based on the examined one or more fields. The CPU 502 may then inject, or pass, the multicast control packet and the replication identifier to the packet processor 512 (block 333) for packet replication. As discussed above, replicating the packet may include accessing a table to lookup the replication identifier (for example by using one or more lookup rules), identifying ports associated with the replication identifier, replicating the packet a number of times corresponding to a number of identified ports 510, and forwarding each copy of the packet to a respective identified port 510.

Although the network switch 220 described with reference to FIGS. 3A, 3B, 4, and 5 may replicate multicast control packets in the packet processor 512 and replication module 518, as described with FIG. 5 the control multicast packet to be replicated may be initially received in the CPU 502 and multicast module 508 thereof as part of preparing for replication of the multicast control packet. This is advantageous over replication of multicast control packet by software, in that the CPU 502 may only need to participate in the preparation of the replication, thus reducing latency and freeing the CPU 502 to perform different operations rather than replication of the multicast control packet.

Figure 6:
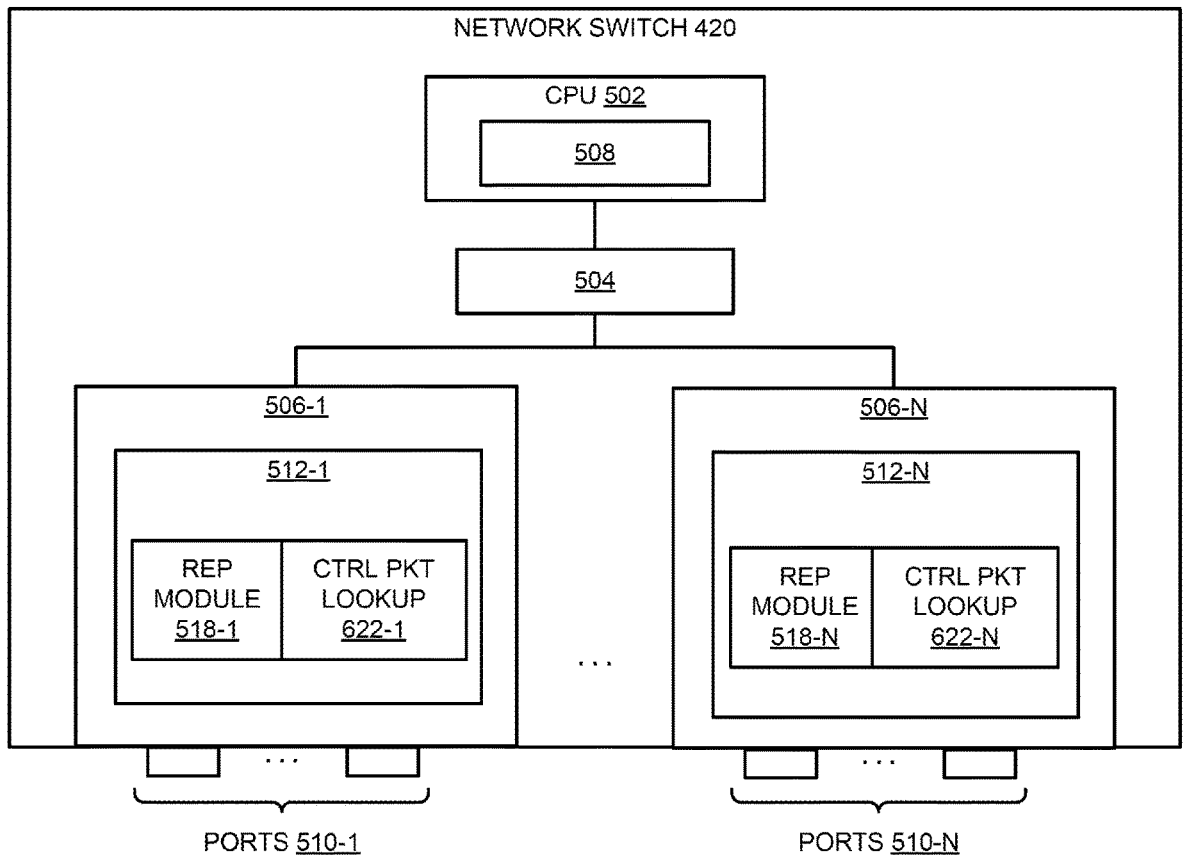
FIG. 6 is a block diagram illustrating an example of a network switch in accordance with some embodiments.
Figure 7:
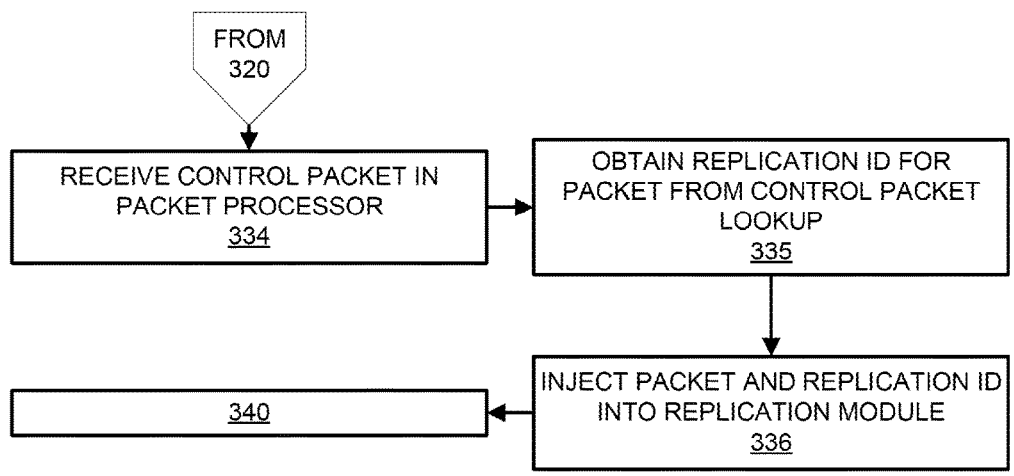
FIG. 7 is a flowchart illustrating operations of a method of performing hardware-based replication of multicast control packets using the network switch of FIG. 6.

FIG. 6 is a block diagram illustrating an example of a network switch 420 in accordance with some embodiments, and FIG. 7, in conjunction with FIGS. 3A and 3B, is a flowchart illustrating operations of a method of performing hardware-based replication of multicast control packets using the network switch of FIG. 6. The network switch 420 of FIG. 6 may differ from the network switch 220 of FIG. 4 by including a control packet lookup table 622. The control packet lookup table 622 may be managed by the CPU 502 during configuration of the replication module 518 for hardware-based replication of multicast control packets. For example, the control packet lookup table 622 may include associations between one or more packet fields (e.g., packet type) and replication identifiers. A plurality of control packet lookup tables 622 may be provided. For example, each packet processor 512 may include a control packet lookup table 622.

The network switch 420 of FIG. 6 may be configured to perform the operations of FIGS. 3A and 3B. Aspects of receiving the control packet to be replicated and preparing for replication (block 330 of FIG. 3A) in the network switch 420 of FIG. 6 are described in greater detail with respect to FIG. 7. The multicast control packet may be received in the packet processor 512 (block 334). Using the control packet lookup table 622, the packet processor 512 may be configured to extract one or more fields from the multicast control packet and perform a lookup into the control packet lookup table 622 to obtain a replication identifier (block 335). The replication identifier and the multicast control packet may be injected or passed to the replication module for packet replication (block 336). As discussed above, replicating the packet may include identifying ports associated with the replication identifier, replicating the packet a number of times corresponding to a number of identified ports 510, and forwarding each copy of the packet to a respective identified port 510.

In contrast with the network switch 220 described with reference to FIGS. 3A, 3B, 4, and 5, in which the control multicast packet to be replicated may be initially received in the CPU 502 and multicast module 508 thereof as part of preparing for replication of the multicast control packet, in the network switch 420 described with reference to FIGS. 3A, 3B, 6, and 7 the multicast control packet to be replicated may not be received by the CPU 502. This is also advantageous over replication of multicast control packet by software, in that the CPU 502 may only need to participate in the configuration of the replication module 518 and control packet lookup table 622, thus reducing latency and freeing the CPU 502 to perform different operations rather than replication of the multicast control packet.

Figure 8:
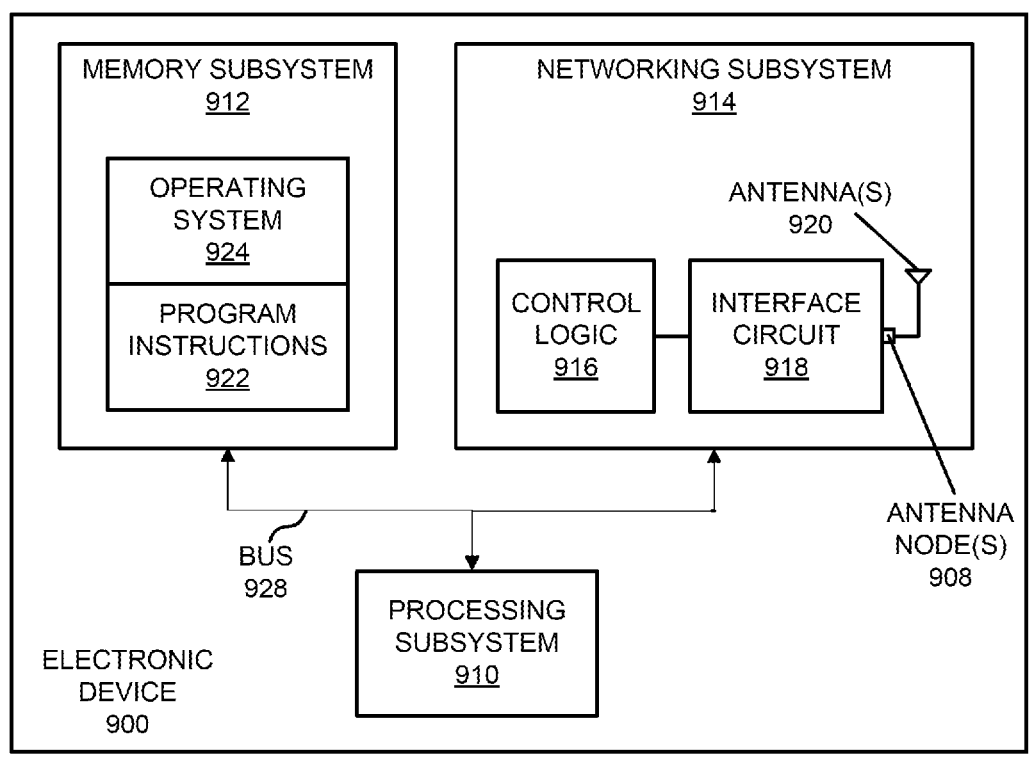
FIG. 8 is a block diagram illustrating an electronic device in accordance with some embodiments.

FIG. 8 is a block diagram illustrating an example electronic device 900 in accordance with some embodiments. Examples of electronic devices 900 may be the networking devices described with reference to FIG. 1, 2, 4, 6, or one of the client devices described with reference to FIG. 1 or 2. The electronic device 900 includes a processing subsystem 910, a memory subsystem 912, and a networking subsystem 914. Processing subsystem 910 includes one or more devices configured to perform computational operations. Memory subsystem 912 includes one or more devices for storing data and/or instructions. In some embodiments, the instructions may include an operating system and one or more program modules which may be executed by processing subsystem 910.

Networking subsystem 914 includes one or more devices configured to couple to and communicate on a wired (i.e., to perform network operations), including: control logic 916 and an interface circuit 918, and optionally one or more antennas 920 and/or antenna nodes 908. Networking subsystem 914 includes processors, controllers, and/or other devices used for coupling to, communicating on, and handling data and events for each supported networking system. Note that mechanisms used for coupling to, communicating on, and handling data and events on the network for each network system are sometimes collectively referred to as a "network interface" for the network system. Electronic device 900 may use the mechanisms in networking subsystem 914 for transmitting packets to other devices and for receiving packets from other devices.

Processing subsystem 910, memory subsystem 912, and networking subsystem 914 are coupled together using bus 928. Bus 928 may include an electrical, optical, and/or electro-optical connection that the subsystems can use to communicate commands and data among one another.

The operations performed in the communication techniques according to embodiments of the present invention may be implemented in hardware or software, and in a wide variety of configurations and architectures. For example, at least some of the operations in the communication techniques may be implemented using program instructions 922, operating system 924 (such as a driver for interface circuit 918) or in firmware in interface circuit 918. Alternatively, or additionally, at least some of the operations in the communication techniques may be implemented in a physical layer, such as hardware in interface circuit 918.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

What is claimed is:

1. A method comprising:
   learning, by a networking device, two or more local routers coupled to ports of the networking device;
   storing directly at the networking device, an association between the two or more local routers and the ports of the networking device based on the learning;
   configuring a packet processor of the networking device for hardware-based replication of multicast control packets based on the association between the two or more local routers and the ports of the networking device that was directly stored at the networking device;
   receiving a multicast control packet by the networking device; and
   replicating, by the packet processor of the networking device, the multicast control packet using the hardware-based replication, based on the association between the two or more local routers and the ports of the networking device that was directly stored at the networking device.

2. The method of claim 1, wherein the networking device comprises a central processor separate from the packet processor.

3. The method of claim 2, wherein the central processor performs the configuring of the packet processor for the hardware-based replication of multicast control packets.

4. The method of claim 2, wherein the central processor performs the learning of the two or more local routers coupled to the ports of the networking device.

5. The method of claim 2, wherein receiving the multicast control packet by the networking device comprises receiving the multicast control packet by the central processor.

6. The method of claim 5, further comprising:
   obtaining, by the central processor, a replication identifier; and
   injecting, by the central processor, the replication identifier and the multicast control packet to a replication module of the packet processor,
   wherein the replicating the multicast control packet by the packet processor is based on the replication identifier.

7. The method of claim 6, wherein the packet processor is associated with a table mapping the replication identifier to ports of the networking device associated with the learned two or more local routers.

8. The method of claim 1, wherein receiving the multicast control packet by the networking device comprises receiving the multicast control packet by the packet processor, the method further comprising:
obtaining, by the packet processor and from a control lookup table, a replication identifier,
wherein replicating the multicast control packet by the packet processor is based on the replication identifier.

9. The method of claim 8, wherein the packet processor is associated with a table mapping the replication identifier to ports of the networking device associated with the learned two or more local routers.

10. The method of claim 8, wherein obtaining the replication identifier from the control lookup table comprises performing a look up in the control lookup table using at least one field of the multicast control packet.

11. The method of claim 1, wherein learning of the two or more local routers coupled to the ports of the networking device comprises reading a control message addressed to a device different from the networking device.

12. The method of claim 11, wherein the control message is an Internet Group Management Protocol (IGMP) or Multicast Listener Discovery (MLD) message.

13. The method of claim 11, wherein the control message is a Protocol Independent Multicast (PIM) message.

14. A method comprising:
learning, by a first processor of a networking device, two or more local routers coupled to ports of the networking device;
storing directly at the networking device, an association between the two or more local routers and the ports of the networking device based on the learning;
configuring, by the first processor of the networking device, a second processor of the networking device for hardware-based replication of multicast control packets based on the association between the two or more local routers and the ports of the networking device that was directly stored at the networking device;
receiving, by the first processor, a multicast control packet;
obtaining, by the first processor, a replication identifier associated with at least two ports of the networking device;
injecting, by the first processor, the replication identifier and the multicast control packet into the second processor; and
replicating, by the second processor, the multicast control packet using the hardware-based replication, based on the association between the two or more local routers and the ports of the networking device that was directly stored at the networking device.

15. The method of claim 14, wherein learning of the two or more local routers coupled to the ports of the networking device comprises reading a control message addressed to a device different from the networking device.

16. The method of claim 15, wherein the control message is an Internet Group Management Protocol (IGMP) or Multicast Listener Discovery (MLD) message.

17. The method of claim 15, wherein the control message is a Protocol Independent Multicast (PIM) message.

18. The method of claim 14, wherein the second processor is associated with a table mapping the replication identifier to the at least two ports of the networking device.

19. A method comprising:
learning, by a first processor of a networking device, two or more local routers coupled to ports of the networking device;
storing directly at the networking device, an association between the two or more local routers and the ports of the networking device based on the learning;
configuring, by the first processor of the networking device, a second processor of the networking device for hardware-based replication of multicast control packets based on the association between the two or more local routers and the ports of the networking device that was directly stored at the networking device;
receiving, by the second processor, a multicast control packet;
obtaining, by the second processor, a replication identifier associated with at least two ports of the networking device; and
replicating, by the second processor and based on the replication identifier, the multicast control packet using the hardware-based replication, based on the association between the two or more local routers and the ports of the networking device that was directly stored at the networking device.

20. The method of claim 19, wherein learning of the two or more local routers coupled to the ports of the networking device comprises reading a control message addressed to a device different from the networking device, the control message an Internet Group Management Protocol (IGMP), a Multicast Listener Discovery (MLD) message, or a Protocol Independent Multicast (PIM) message.

* * * * *